(12) United States Patent
Hart

(10) Patent No.: US 8,778,496 B2
(45) Date of Patent: Jul. 15, 2014

(54) ANTI-GLARE GLASS SHEET HAVING COMPRESSIVE STRESS EQUIPOISE AND METHODS THEREOF

(75) Inventor: Shandon Dee Hart, Corning, NY (US)

(73) Assignee: Corning Incorporated, Corning, NY (US)

(*) Notice: Subject to any disclaimer, the term of this patent is extended or adjusted under 35 U.S.C. 154(b) by 358 days.

(21) Appl. No.: 13/270,338

(22) Filed: Oct. 11, 2011

(65) Prior Publication Data

US 2012/0134025 A1 May 31, 2012

Related U.S. Application Data

(60) Provisional application No. 61/418,133, filed on Nov. 30, 2010.

(51) Int. Cl.
| | |
|---|---|
| B32B 3/00 | (2006.01) |
| C03C 15/00 | (2006.01) |
| C03C 21/00 | (2006.01) |
| G02B 5/00 | (2006.01) |
| C03C 19/00 | (2006.01) |
| G02B 5/02 | (2006.01) |

(52) U.S. Cl.
CPC ............ *C03C 15/00* (2013.01); *C03C 19/00* (2013.01); *C03C 21/002* (2013.01); *C03C 2204/08* (2013.01); *G02B 5/0221* (2013.01)
USPC .......... 428/410; 428/141; 359/601; 65/30.14; 65/31

(58) Field of Classification Search
None
See application file for complete search history.

(56) References Cited

U.S. PATENT DOCUMENTS

| | | | | |
|---|---|---|---|---|
| 3,374,141 | A * | 3/1968 | Junge et al. | 428/433 |
| 3,616,098 | A | 10/1971 | Falls | 161/1 |
| 4,921,626 | A | 5/1990 | Rhodenbaugh | 252/79.4 |
| 5,090,982 | A * | 2/1992 | Bradshaw et al. | 65/24 |
| 5,773,148 | A * | 6/1998 | Charrue et al. | 428/410 |
| 5,989,450 | A | 11/1999 | Kim | 252/79.4 |
| 6,172,817 | B1 | 1/2001 | Senapati et al. | 359/654 |
| 6,807,824 | B1 | 10/2004 | Miwa | 65/31 |
| 6,821,893 | B2 * | 11/2004 | Kurachi et al. | 438/690 |
| 6,822,157 | B2 * | 11/2004 | Fujioka | 136/251 |
| 2010/0246016 | A1 | 9/2010 | Carlson et al. | |
| 2010/0279068 | A1 | 11/2010 | Cook et al. | |

FOREIGN PATENT DOCUMENTS

WO 02/053508 A1 11/2002

* cited by examiner

*Primary Examiner* — David Sample
(74) *Attorney, Agent, or Firm* — John L. Haack

(57) ABSTRACT

A chemically-strengthened glass sheet including: a smooth first side; and a rough second side, wherein the compressive stress values of the smooth first-side and the rough second-side are substantially in equipoise. Methods of making and using the glass sheet, as defined herein, are disclosed. A display system that incorporates the glass sheet, as defined herein, is also disclosed.

8 Claims, 1 Drawing Sheet

ANTI-GLARE GLASS SHEET HAVING COMPRESSIVE STRESS EQUIPOISE AND METHODS THEREOF

CROSS-REFERENCE TO RELATED APPLICATION

This application claims the benefit of priority under 35 U.S.C. §119 of U.S. Provisional Application Ser. No. 61/418,133, filed on Nov. 30, 2010, the content of which is relied upon and incorporated herein by reference in its entirety.

BACKGROUND

The disclosure relates generally to an anti-glare surface, an anti-glare article incorporating the anti-glare surface, and methods of making and using the anti-glare surface and article.

SUMMARY

The disclosure provides an anti-glare glass surface and anti-glare articles, such as a sheet, incorporating the anti-glare surface. The disclosure also provides an anti-glare glass sheet having compressive stress equipoise and methods of making and using the glass sheet.

BRIEF DESCRIPTION OF THE DRAWING(S)

In embodiments of the disclosure:

DETAILED DESCRIPTION

Figure 1:
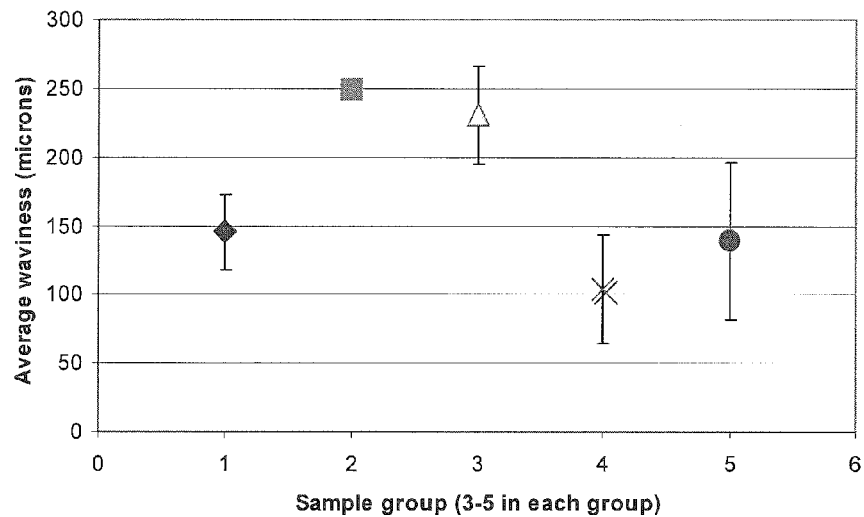
FIG. 1 shows measured results for average waviness of selected sample groups 1 to 5.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed articles, and the disclosed method of making and use provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

DEFINITIONS

"Anti-glare," "AG," or like terms refer to a physical transformation of light contacting the treated surface of an article, such as a display, of the disclosure that changes, or to the property of changing light reflected from the surface of an article, into a diffuse reflection rather than a specular reflection. In embodiments, the AG surface treatment can be produced by mechanical or chemical etching. Anti-glare does not reduce the amount of light reflected from the surface, but only changes the characteristics of the reflected light. An image reflected by an anti-glare surface has no sharp boundaries. In contrast to an anti-glare surface, an anti-reflective surface is typically a thin-film coating that reduces the reflection of light from a surface via the use of refractive-index variation and, in some instances, destructive interference techniques.

"Optical scattering" or like terms refers to any amount of diffuse (i.e., non-specular) reflection or transmission behavior of light interacting with a material or surface, regardless of the microscopic, mesoscopic, or macroscopic origin of the light diffusion.

"Distinctness-of-reflected image," "distinctness-of-image," "DOI" or like term is defined by method A of ASTM procedure D5767 (ASTM 5767), entitled "Standard Test Methods for Instrumental Measurements of Distinctness-of-Image Gloss of Coating Surfaces." In accordance with method A of ASTM 5767, glass reflectance factor measurements are made on the at least one roughened surface of the glass article at the specular viewing angle and at an angle slightly off the specular viewing angle. The values obtained from these measurements are combined to provide a DOI value. DOI can be calculated according to equation (1):

$$DOI = \left[1 - \frac{Ros}{Rs}\right] \times 100 \qquad (1)$$

where Rs is the relative amplitude of reflectance in the specular direction and Ros is the relative amplitude of reflectance in an off-specular direction. Ros, unless otherwise specified, can be calculated by averaging the reflectance over an angular range from 0.2° to 0.4° away from the specular direction. Rs can be calculated by averaging the reflectance over an angular range of ±0.05° centered on the specular direction. Both Rs and Ros were measured using a goniophotometer (Novo-gloss IQ, Rhopoint Instruments) that is calibrated to a certified black glass standard, as specified in ASTM procedures D523 and D5767. The Novo-gloss instrument uses a detector array in which the specular angle is centered about the highest value in the detector array. DOI was also evaluated using 1-side (black absorber coupled to rear of glass) and 2-side (reflections allowed from both glass surfaces, nothing coupled to glass) methods. The 1-side measurement allows the gloss, reflectance, and DOI to be determined for a single surface (e.g., a single roughened surface) of the glass article, whereas the 2-side measurement enables gloss, reflectance, and DOI to be determined for the glass article as a whole. The Ros/Rs ratio can be calculated from the average values obtained for Rs and Ros as described above. "20° DOI," or "DOI 20°" refers to DOI measurements in which the light is incident on the sample at 20° off the normal to the glass surface, as described in ASTM D5767. The measurement of either DOI or common gloss using the 2-side method can best be performed in a dark room or enclosure so that the measured value of these properties is zero when the sample is absent. For anti-glare surfaces, it is generally desirable that DOI be relatively low and the reflectance ratio (Ros/Rs) of eq. (1) be relatively high. This results in visual perception of a blurred or indistinct reflected image. In embodiments, the at least one roughened surface of the glass article has a Ros/Rs greater than about 0.1, greater than about 0.4, and, greater than about 0.8, when measured at an angle of 20° from the specular direction using the 1-side method measurement. Using the 2-side method, the Ros/Rs of the glass article at a 20° angle from the specular direction is greater than about 0.05. In embodiments, the Ros/Rs measured by the 2-side method for the glass article is greater than about 0.2, and greater than about 0.4. Common gloss, as measured by ASTM D523, is insufficient to distinguish surfaces with a strong specular reflection component (distinct reflected image) from those with a weak specular component (blurred reflected image). This can be attributable to the small-angle scattering effects that are not measureable using common gloss meters designed according to ASTM D523.

"Equipoise" or like terms refer to something that creates or resides in a balanced state, e.g., having equal or balanced tension, such as by counterbalancing a force or property. Thus, in embodiments, the measured compressive stress value for each side of a sheet processed in accord with the disclosure are balanced, substantially the same, or in equipoise.

"Transmission haze," "haze," or like terms refer to a particular surface light scatter characteristic related to surface roughness. Haze measurement is specified in greater detail below.

"Roughness," "surface roughness (Ra)," or like terms refer to, on a microscopic level or below, an uneven or irregular surface condition, such as an average root mean squared (RMS) roughness or RMS roughness described below.

"Waviness" or like terms refer to the maximum height variation from the highest point to the lowest point of a single-side or surface of the glass sheet, not including front-to-back thickness variation, when the glass sheet is laid on a flat measuring table. Waviness represents the overall curvature of a sheet, or alternatively, the sheet's deviation from flatness. The waviness can be caused by, for example, forming processes, residual stresses, and like considerations, or combinations thereof. Waviness is a long-wave variation in the sample surface height, up to and including the entire dimensions of the sample. An alternative term is "warp," which for the purpose of this application is synonymous with or identical to waviness. The warp of a finished glass sheet can depend upon, for example, the warp of the initial or input glass sheet.

"Average waviness" or like terms refer to, for example, an estimation of or approximation to an arithmetic mean of the waviness for two or more samples.

"Roughen," "roughening," or like terms refer to, for example, to make at least one surface of a glass sheet rough or rougher, or having an uneven or bumpy surface that is greater than the surface prior to, for example, the disclosed roughening or etchant treatment.

"Gloss," "gloss level," or like terms refer to, for example, surface luster, brightness, or shine, and more particularly to the measurement of specular reflectance calibrated to a standard (such as, for example, a certified black glass standard) in accordance with ASTM procedure D523. Common gloss measurements are typically performed at incident light angles of 20°, 60°, and 85°, with the most commonly used gloss measurement being performed at 60°. Due to the wide acceptance angle of this measurement, however, common gloss often cannot distinguish between surfaces having high and low distinctness-of-reflected-image (DOI) values. The anti-glare surface of the glass article has a gloss (i.e., the amount of light that is specularly reflected from sample relative to a standard at a specific angle) of up to 90 SGU (standard gloss units), as measured according to ASTM D523, and in embodiments, has a gloss of from about 20 SGU to about 80 SGU.

"ALF" or "average characteristic largest feature size" or like terms refer to a measure of surface feature variation in the x- and y-direction as is discussed further below.

"Sparkle," "display sparkle," or like terms refer to the relationship between the size of features on the at least one roughened glass surface and pixel pitch, particularly the smallest pixel pitch, is of interest. Display "sparkle" is commonly evaluated by human visual inspection of a material that is placed adjacent to a pixelated display. ALF and its relationship to display "sparkle" has been found to be a valid metric for different materials having different surface morphologies, including glasses of varying composition and particle-coated polymer materials. A strong correlation between average largest characteristic feature size (ALF) and visual ranking of display sparkle severity exists across multiple different sample materials and surface morphologies. In embodiments, the glass article can be a glass panel that forms a portion of a display system. The display system can include a pixelated image display panel that is disposed adjacent to the glass panel. The smallest pixel pitch of the display panel can be greater than ALF.

"Uniformity," "uniform," or like terms refer to, for example, a chemically etched surface that appears homogeneous, and is free of visually detectable streaks, pin holes, blotches, and like defects. Alternatively, uniformity can be a measure of haze, DOI, and gloss. In embodiments, the variation of measured values within a sheet is less than about 10% of an average value. The visual inspection method is based on unaided eyes of a human viewer. Typically, a sample is placed under a 500+/−200 Lux fluorescent light with a black background, and the distance between viewer's eyes and samples is 30+/−5 cm. The sample is rotated during inspection, typically about +45° from the starting position.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, and like values, and ranges thereof, employed in describing the embodiments of the disclosure, refers to variation in the numerical quantity that can occur, for example: through typical measuring and handling procedures used for making compounds, compositions, composites, concentrates, coatings, etchings, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing an article, a composition, or a formulation with a particular initial concentration or mixture. The claims appended hereto include equivalents of these "about" quantities.

"Consisting essentially of" in embodiments refers, for example, an article having an anti-glare surface, to an anti-glare article, to a method of making an anti-glare article having an anti-glare surface and precursors thereto, devices incorporating the article having an anti-glare surface, or any apparatus of the disclosure, and can include the components or steps listed in the claim, plus other components or steps that do not materially affect the basic and novel properties of the compositions, articles, apparatus, or methods of making and use of the disclosure, such as particular reactants, particular additives or ingredients, a particular agents, a particular surface modifier or condition, or like structure, material, or process variable selected. Items that may materially affect the basic properties of the components or steps of the disclosure or that may impart undesirable characteristics to the present disclosure include, for example, a surface having objectionable high glare or high gloss properties, for example, having a haze, a distinctness-of-image, a surface roughness, a uniformity, or a combination thereof, that are beyond the values, including intermediate values and ranges, defined and specified herein.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, and like abbreviations).

Specific and preferred values disclosed for components, ingredients, additives, and like aspects, and ranges thereof, are for illustration only; they do not exclude other defined values or other values within defined ranges. The compositions, article, apparatus, and methods of the disclosure can include any value or any combination of the values, specific values, more specific values, and preferred values described herein.

In embodiments, the disclosure is applicable to, for example, thin, chemically strengthened glass sheets, such as ion-exchanged Gorilla® Glass. In embodiments, the disclosure is directed to the reduction of waviness in a thin, chemically strengthened sheet of glass that has an anti-glare (AG) treatment on at least one side of the glass sheet, such as on one side of the glass sheet but not the other. In embodiments, one side of the glass sheet can have a higher surface roughness than the other. The rougher surface results in optical scattering while the less rough surface of the sheet can be optically smooth or nearly smooth.

Glass etching and roughening processes have been described in, for example, U.S. Pat. Nos. 3,616,098, 4,921, 626, and 6,807,824.

There are many reasons to create an anti-glare or roughened surface on sheet glass. One reason is to reduce the sharpness of mirror images reflected from the glass, resulting in a more pleasing visual appearance in some applications. When the glass is used as a cover glass for electronic display devices, this reduction in the sharpness of mirror reflection can result in better visibility (viewability) of the display, reduced eye strain, and a better user experience. Reduced sharpness of mirror reflection can be quantified as reduced distinctness-of-reflected-image, or DOI, according to ASTM D5767, and as discussed in commonly owned and assigned copending application U.S. Ser. No. 61/242,529. When the sheet glass is used as a cover in a touch-sensitive device, the roughened surface can further improve the ability of fingers, styli (styluses), or like pointer objects to "glide" over the surface of the touch device with reduced sticking, which can provide, e.g., improved accuracy of the touch input, improved user performance, reduced fatigue, and improved perception of usability by a user. There are several reasons why it may be more desirable or practical to create a single-sided anti-glare sheet of glass (i.e., a glass sheet having a roughened surface on only one side). One reason relates to the end-use of the glass. In some applications, the glass may be used as a substrate for touch-sensor deposition, where it can be desirable to have one surface which is flat and relatively smooth for sensor deposition, and the other surface is rough. The rough surface faces towards the viewer to achieve the aforementioned optical or tactile effects. Also, depending on the end application, the anti-glare treated glass may be bonded on the back side (non-viewer side) to other components such as adhesives, touch sensor plates, black printed borders or logos, anti-splinter films, LCD's, and like components. In some of these applications it can be useful to have a flat back-side surface to improve, for example, the bonding to the other components, to minimize trapped air bubbles in a bonding process, or both. Additional reasons can include the ease or cost in processing the glass to create a uniform anti-glare surface. In many applications for the products of the disclosure, it can be more cost-effective to roughen only one side of the glass. In processes involving chemical etching, less chemical etchant is used when only one side of the glass sheet is roughened. In processes involving masking, such as those disclosed in commonly owned and assigned copending applications U.S. Ser. No. 61/329,936 and U.S. Ser. No. 61/329,951, the mask material can be applied to a single side of a sheet to reduce costs, increase ease of handling, and lower material consumption. In processes that involve carrying the glass, for example, on a conveyor like transport system, the surface of the glass that is in contact with the transporter does not need to be roughened, thus eliminating concerns that the contact with the transporter could disrupt the uniformity of the roughening process. The non-roughened surface of the glass sheet can optionally be protected by a barrier film or coating to preserve the flatness or quality of that surface. The optical anti-glare effect is not excessively degraded by placing an anti-glare treatment on a single side provided that the roughened surface of the display device faces the viewer, particularly when the back side of the anti-glare glass sheet is fully bonded across the entire face to other components.

Any suitable process can be used for roughening the glass sheet surfaces. Some applicable roughening processes are disclosed in commonly owned and assigned copending U.S. patent application Ser. Nos. 61/329,936, 61/329,951, 61/242, 529, and 12/730,502. The processes disclosed in the commonly owned applications primarily use wet chemical etching. However, other processes, such as grinding, thermal roughening, sand blasting, laser ablation, reactive-ion-etching, plasma etching, and like roughening methods, or combinations thereof, can be selected.

Waviness of glass sheets is generally undesirable, but may be unavoidable to some degree. It can be important to minimize glass sheet waviness for many reasons, for example, to minimize optical distortion, to provide adequate fit to a display assembly, or to effectively carry out uniform coating or deposition processes on the glass surface, such as those used to form transparent conducting layers that are used in LCDs or touch sensors. From a process perspective, waviness in glass sheets can be introduced at multiple stages. Glass melting and annealing affects the glass stress state and can introduce waviness. Glass grinding, polishing, or etching (to roughen or to smooth surfaces) can also introduce waviness through surface stress introduction (such as that related to the 'Twyman effect'). Ion-exchange or chemical strengthening, thermal tempering, or like thermal treatments can also influence glass waviness. The final absolute level of product waviness can be, for example, some combination of the waviness introduced in each of or any of these process steps. If a high waviness is introduced during initial melting and forming, this can be carried into later processes.

If the warp increases during one or more of the etch procedures then the increased warp should be detectable, measurable, and distinguishable from the initial warp. The initial warp is the warp measured for a glass sheet prior to being subjected any of the treatment steps of the present disclosure; typically measured just after initial melting and forming. In embodiments, the warp of a finished glass sheet can depend heavily upon the warp of the initial or input glass sheet.

In embodiments, the disclosure provides a chemically-strengthened glass sheet comprising:
 a smooth first side; and
 a rough second side,
wherein the compressive stress values of the smooth first side and the rough second side are substantially in equipoise.

"Substantially in equipoise" or "substantially the same compressive stress values" means that the smooth first-side and the rough second-side have less than about 10% relative difference in their respective compressive stress values. In alternative or equivalent terms, the amount of compressive stress on each side of the resulting chemically strengthened glass sheet having a single roughened side and having both-sides chemically strengthened is substantially the same.

In embodiments, the difference between the compressive stress values of the smooth first-side and the rough second-side can be, for example, less than about 2%.

The compressive stress value of the smooth first-side can be, for example, greater than about 400 MPa, the compressive stress value of the rough second-side can be, for example, greater than about 400 MPa, and the difference in the compressive stress values between the two sides of the glass sheet can be, for example, less than about 10 MPa.

In embodiments, the chemically strengthened glass article can contain greater than about 2 mol % of $Al_2O_3$, $ZrO_2$, or both. In embodiments, the chemically strengthened glass article can have, for example, a surface compressive stress greater than about 350 MPa and an ion-exchange depth-of-layer greater than about 15 microns. In embodiments, the chemically strengthened glass article can contain less than about 4 mol % CaO. In embodiments, the smooth first-side can have, for example, an RMS roughness less than about 10 nm and the rough second-side can have, for example, an RMS roughness greater than about 50 nm.

The processed sheet can have, for example, anti-glare properties such as having a 20 degree reflective DOI of less than about 90 and transmission haze of less than about 50.

The sheet can have dimensions, for example, of at least 200 mm×200 mm and the maximum waviness of the sheet after chemical strengthening can be, for example, less than about 200 microns.

In embodiments, the disclosure provides a method of controlling compressive stress in a glass sheet, comprising in order:

roughening one-side of the glass sheet with a roughenant, i.e., roughening agent;

etching both-sides of the glass sheet having a single roughened side with a non-roughening etchant; and chemically strengthening both-sides of the resulting glass sheet having the single roughened side, wherein the compressive stress on each side of the resulting glass sheet is substantially the same.

The roughening produces a surface roughness on the processed area of the glass sheet or article of about 50 nm RMS or more, or at least 100% greater roughness, than the initial or input roughness on the one-side of the glass sheet prior to roughening.

In embodiments, the etching, when accomplished with the non-roughening etchant, increase the surface roughness of either side by no more than about 20 nm RMS.

The chemically strengthening both-sides of the resulting glass sheet having the single roughened side can be accomplished, for example, by an ion-exchange medium, such as a molten alkali salt, and like ion-exchange medium and methods.

The non-roughening etchant can be, for example, HF, any other mineral acid, or a mixture thereof, and the roughenant can, for example, comprise an etchant, a mask, a porous mask, sandblasting, grinding, thermal roughening, laser ablation, reactive-ion-etching, plasma etching, or combinations thereof. The concentration of the acid or the concentration of a combination of acids in the non-roughening etchant can be selected so that the non-roughening etchant does not produce significant roughness.

In embodiments, the disclosed method can further comprise, firstly, protecting one side of the glass sheet with a barrier film prior to the roughening process, so that the roughening creates a surface roughness on the unprotected side of the sheet.

In embodiments, the glass sheet can have, for example, one-side that is optically smooth having no visible light scattering, and the opposite-side can have an optically rough surface having light scattering properties.

In embodiments, strengthening both-sides with the ion-exchange medium can strengthen the glass sheet, such that the difference in the average compressive stress between the two sides of the glass sheet can be, for example, less than about 2% of the combined average value of surface compressive stress. In embodiments, the roughened single-side of the sheet can have, for example, an RMS roughness greater than about 50 nm and the non-roughened surface can have, for example, an RMS roughness less than about 10 nm (these roughness values are substantially the same both before and after chemically strengthening both sides of the sheet). The amount of warp in the resulting glass sheet can be, for example, from about 1 to about 250 microns, from about 5 to about 200 microns, from about 10 to about 150 microns, and like values, including intermediate values. The resulting glass sheet can have a thickness of from about 0.1 mm to about 3 mm and can exhibit desirable anti-glare properties.

In embodiments, the disclosure provides a glass sheet having a thickness of about 2 mm or less that exhibits anti-glare properties, where one surface of the sheet has an optically smooth surface with no visible light scattering, and the opposing surface has an optically rough surface providing light scattering properties. When chemically strengthened the sheet can have a compressive stress on each surface of the sheet greater than, for example, 400 MPa, and the difference in the average compressive stress between the two sides of the glass sheet is less than 2% of the combined average value of surface compressive stress. In embodiments, the compressive stress on the two opposing surfaces of the glass sheet can be, for example, statistically indistinguishable.

In embodiments, the disclosure provides a glass sheet having a thickness of about 2 mm or less, where one surface of the sheet has an RMS roughness greater than about 50 nm and the opposing surface has an RMS roughness less than about 10 nm.

In embodiments, the disclosure provides a glass sheet having a thickness of about 2 mm or less, exhibiting anti-glare properties, where one surface of the sheet has an RMS roughness greater than about 50 nm and the opposing surface has an RMS roughness less than about 10 nm, where the transmission haze of the sheet is less than about 50% and the 20 degree DOI of the sheet is less than about 90. In embodiments, the disclosure provides a glass sheet having a thickness of 1.25 mm or less, exhibiting anti-glare properties, where one surface of the sheet has an optically smooth surface with no visible light scattering, and the opposing surface has an optically rough surface providing light scattering. When the sheet is chemically strengthened, generating a surface compressive stress greater than 400 MPa, the resulting sheet exhibits a maximum waviness (maximum height of waviness or edge lift) less than about two (2) times greater than a sheet of the same or similar glass composition that is fabricated using the same input melting and forming process with two optically smooth surfaces (i.e., no surface roughening).

In embodiments, the disclosure provides a glass sheet having a thickness of about 1.25 mm or less, exhibiting anti-glare properties, where one surface of the sheet has an optically smooth surface with no visible light scattering, and the opposing surface has an optically rough surface leading to light scattering. When both sides of the sheet are chemically strengthened to generate a surface compressive stress greater than about 400 MPa, the resulting sheet exhibits a maximum waviness (maximum height of waviness or edge lift) less than about three (3) times greater than the same sheet before chemical strengthening.

In embodiments, the disclosure provides a glass sheet having a thickness of about 1.25 mm or less exhibiting anti-glare properties, where one surface of the sheet has an optically smooth surface with no visible light scattering, and the opposing surface has an optically visible amount of roughness leading to light scattering, where the transmission haze of the sheet can be, for example, less than about 50% and the 20 degree DOI of the sheet is less than about 90. When the sheet is chemically strengthened, generating a surface compressive stress greater than about 400 MPa, the resulting sheet exhibits a maximum waviness (maximum height of waviness or edge lift) less than about two (2) times greater than a sheet of the same or similar glass composition that is fabricated with two optically smooth surfaces (i.e., no surface roughening).

In embodiments, the disclosure provides a glass sheet having a thickness of about 0.75 mm or less, exhibiting anti-glare properties, where one surface has an RMS roughness greater than about 40 nm and the opposing surface has an RMS roughness less than about 10 nm. When a 200×200 mm portion of the sheet was chemically strengthened to generate a surface compressive stress greater than 400 MPa, the resulting 200×200 mm sheet exhibited a maximum waviness (maximum height of waviness or edge lift) less than about 200 microns.

In embodiment, the disclosure provides a method for making a glass sheet exhibiting anti-glare properties, where one surface has an RMS roughness greater than about 40 nm and the opposing surface has an RMS roughness less than about 10 nm. The method can include, for example, etching both surfaces of the glass, removing at least 0.1 microns of glass from each glass surface using a wet-etch technique that dissolves the silica network of the glass. The etch process can be accomplished such that the roughness on one surface is larger than the other, which can be accomplished using various methods. After the etching process, the etched glass sheet can then be chemically strengthened. The resulting glass sheet can be thin having a thickness of, for example, from about 0.1 mm to about 3 mm, and have a low waviness level after chemical strengthening, for example, of no more than about two (2) times the waviness level of a similar chemically strengthened glass sheet having no etch treatment on either side or a similar sheet having substantially the same surface roughness on both sides.

In embodiments, the etching procedures can be accomplished after chemical strengthening, where a similar amount of glass is removed from both sides of the sheet, but one surface is optically smooth and the other rough. Similar amounts of glass removal can result in substantially similar compressive stresses on both surfaces, and a corresponding low waviness, even if the roughness of the two surfaces is substantially different.

In embodiment, the disclosure provides a method for creating a glass sheet exhibiting anti-glare properties, where one surface has an RMS roughness greater than about 40 nm and the opposing surface has an RMS roughness less than about 10 nm. One side of the glass sheet can be protected by, for example, a barrier film during a first etching process, where the first etching process creates a surface roughness on the unprotected side of the sheet according to the methods disclosed in, for example, the aforementioned commonly owned and assigned U.S. patent application Ser. Nos. 61/329,936, 61/329,951, 61/242,529 and 12/730,502. After the first etching process, the glass sheet can be rinsed and the barrier film can be separately or simultaneously removed, exposing the underlying un-etched smooth surface. The glass sheet can then be subjected to a second "non-roughening" etch process that etches both sides of the sheet substantially smoothly (i.e., without modifying the surface roughness of either side of the glass sheet significantly, for example, the roughening can be less than about 50 nm RMS or less than about 25% greater than the initial or input roughness. In embodiments, the non-roughening etch process preferably does not increase the surface roughness by more than about 20 nm RMS. In embodiments, the non-roughening etch process may reduce the surface roughness by, for example, from 0 to about 25% or more. In embodiments, at least 0.1 microns (but less than 100 microns) of material can be removed from each glass surface during the second "non-roughening" etch process, using, for example, a wet-etch technique that dissolves the surface silica network of the glass. The glass sheet can then be chemically strengthened after the etching processes resulting in a surface compressive stress on each side of the glass sheet that is, for example, greater than about 400 MPa, and where the average compressive stresses on each surface of the glass are in equipoise, that is for example, statistically substantially the same. The resulting glass sheet can be thin having a thickness, for example, of from about 0.1 to about 3 mm, and have a low waviness level after chemical strengthening, that is no greater than about two times the waviness level of a similar chemically strengthened glass sheet having no etch treatment on either side or a similar sheet having substantially the same surface roughness on both sides.

After the roughening or first etching process, the glass sheet can be rinsed and the barrier film can be separately or simultaneously removed, to expose the underlying protected or un-etched smooth surface. The glass sheet can then be subjected to a second "non-roughening" etch process that etches both sides of the sheet substantially smoothly (i.e., without modifying the surface roughness of either side of the glass sheet significantly). For example, the roughening can be less than about 50 nm RMS or less than about 25% greater than the initial or input roughness. In embodiments, the non-roughening etch process preferably does not increase the surface roughness by more than about 20 nm RMS. In embodiments, the non-roughening etch process may reduce the surface roughness by, for example, of from 0 to about 25% or more, from about 0.1 to about 20%, including intermediate values and ranges. In embodiments, at least 0.5 microns (but less than 10 microns) of material can be removed from each glass surface during the second "non-roughening" etch process, using, for example, a wet-etch technique that selectively dissolves the surface silica network of the glass. The glass sheet can then be chemically strengthened after the roughening and etching processes to result in a surface compressive stress on each side of the glass sheet that is, for example, greater than about 400 MPa, and where the average compressive stress on each surface of the glass can be, for example, substantially statistically, the same. The resulting glass sheet can be thin having a thickness, for example, of from about 0.1 to about 3 mm, and have a low waviness level after chemical strengthening, which waviness level is no greater than about two times the waviness level of a similar chemically strengthened glass sheet having no etch treatment on either side, or a similar sheet having substantially the same surface roughness on both sides.

In embodiment, the glass sheet in the foregoing demonstrations can be, for example, an aluminosilicate glass article having an $Al_2O_3$ content greater than about 2 mol %. In embodiments, the aluminosilicate glass can be, for example, an alkali aluminosilicate composition comprising: 60-75 mol % $SiO_2$; 6-15 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≤$Li_2O+Na_2O+K_2O$≤20 mol % and 0 mol %≤MgO+CaO≤10 mol %.

In embodiments, the disclosure provides a display system including a pixelated image-displaying panel such as an LCD, OLED display, and like displays, situated adjacent to any of the glass sheets described above.

In embodiments, the disclosure provides an input device for an information processing or communications device, such as a computer or mobile phone, where the input device is sensitive to contact or proximity of a foreign object, such as a touch screen, where the input device consists of electrical or optical sensing elements placed in proximity to or coated directly onto any of the abovementioned glass sheets.

In embodiments, the disclosure can provide reduced-waviness anti-glare sheets by creating a similar roughened surface on both sides of the sheet (two-sided anti-glare). However, a feature of the disclosure is to provide a substantially, one-sided or single-sided anti-glare sheet, for the aforementioned reasons.

Reduced waviness can be a significant factor for optical quality, low display image distortion, customer perception of quality, and for enabling the deposition of thin films or sensors uniformly on the surface of the glass.

An ability to reduce or control the amount of warp or waviness in glass sheets as presently disclosed can be advantageous for at least one or more of the following reasons: improved optical quality of glass sheets; low distortion of displayed images projected on to or through the glass sheets; enhanced customer acceptance, perceived higher quality, improved yield of coating and bonding processes, for example, in a display assembly, improved performance and uniformity of thin films or sensors deposited on the glass, and like features, or combinations thereof.

Experiments of the disclosure lead to the discovery that single-sided roughening of thin glass sheets followed by ion-exchange chemical strengthening of the roughened side can cause a higher waviness in the sheets than what was present before roughening and chemical strengthening. The roughening processes that were tested included wet chemical etching as disclosed in the commonly owned and assigned copending applications. Waviness does not appear to increase after roughening only, but rather after the combination of roughening and ion exchange. The present disclosure provides a method for controlling, limiting, or reducing the waviness introduced during the course of a process including single-side roughening followed by ion exchange. In embodiments, the level of waviness reduction that is achievable with the disclosed processes is, for example, to a level that is substantially the same as an input glass that is chemically strengthened and without the roughening treatment process.

Referring to the Figures, FIG. 1 shows measured results for average waviness of a sample group. Sample treatment listing: Etch treatment: first-side/second-side: none/none (diamonds); none/"AG" (squares); none/"HF" (triangles); "HF"/"AG" (crosses); and "HF"/"HF" (circles). Sample groups 4 and 5 have reduced waviness, similar to the control sample group 1, which correlates to both surfaces of groups 4 and 5 being wet-etched. The low waviness occurs in group 4 even though the surface roughness of one side of the group 4 samples is much higher than the other side of group 4 samples.

FIG. 1 illustrates several significant aspects of the disclosure. This data compares the post-ion-exchange waviness level of five different sample sets. All samples in this set were 200 mm×200 mm×(0.6 to 0.65) mm in dimension, made using Corning 2318 aluminosilicate glass. Waviness was measured using a Tropel® Flatmaster® (available from Corning, Inc. (www.corning.com)), which uses the term 'flatness' to measure "waviness." The samples were etched before ion-exchange strengthening. Sample waviness was measured before etch, after etch, and after ion-exchange. No appreciable change in waviness was measured after etching alone. However, there was a slightly elevated waviness level before etching (the as-melted state) of about 30 to about 90 microns, with an average of about 60 microns. This elevated initial waviness level can affect the absolute level of the final waviness after later process steps in these experimental samples. A few samples with initial (as-melted) waviness of greater than 90 microns were removed from this sample set.

Figure 2:
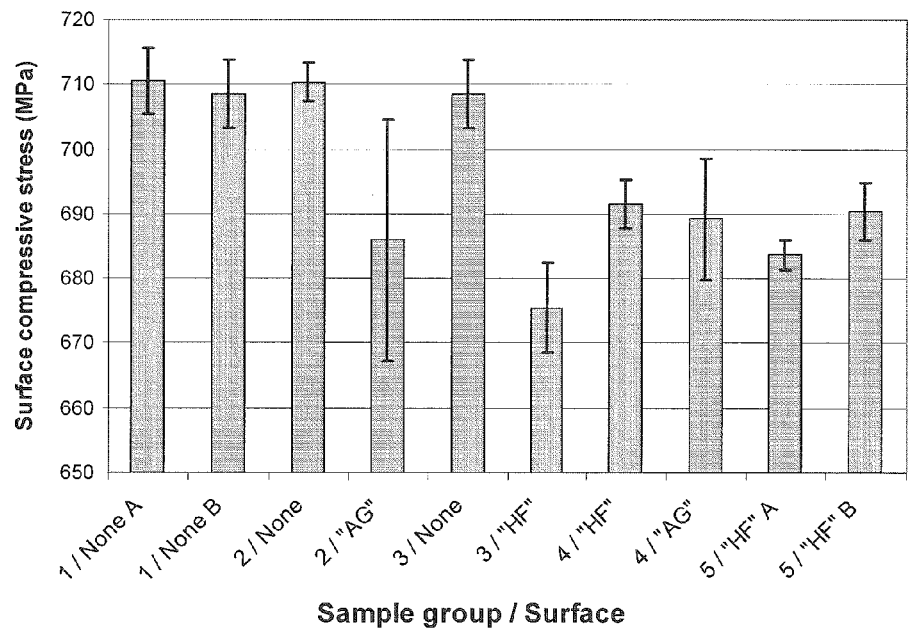
FIG. 2 shows surface compressive stress on each side of the glass sheet sample for the sample groups 1 to 5 in FIG. 1.

FIG. 2 shows surface compressive stress on each side of the glass sheet sample for the same sample groups shown in FIG. 1. Sample groups 1, 4, and 5 have similar compressive stress on both surfaces, which correlates to lower waviness in those samples. Sample groups 2 and 3 have an imbalance in average surface compressive stress between the two surfaces of the sample, which correlates to higher waviness in those samples. The measurement error for anti-glare ("AG") surfaces was somewhat higher due to the roughness and scattering of these surfaces, but the trends were reproducible and distinct.

The sample sets were named according to their $1^{st}/2^{nd}$ side etch treatment. Sample group-1 is the control sample set, which was ion-exchanged with no roughening or etching on either side. Group-1 has an average waviness of about 150 microns after ion-exchange, compared to about 50 microns on average before ion-exchange. This waviness level is slightly elevated relative to what would be expected in standard production, and may be due to stress non-uniformities introduced during initial melting and forming (as indicated by the initially slightly elevated 50 micron waviness of the sheets after initial melting and forming). These glass samples were formed using a "fusion" process, where both surfaces of the glass sheet after melting and forming represent similar melt surfaces.

The anti-glare ("AG") surface roughening was carried out according to a multi-step chemical etch treatment similar to that described in commonly owned U.S. Ser. No. 12/730,502. The final step in this AG treatment was a 10 minute etch in a 3M/3.6M $HF/H_2SO_4$ bath. The hydrofluoric acid ("HF") treatment was a single-step etch process consisting of only the final step in the AG treatment, that is, a 10 minute etch in 3M/3.6 M $HF/H_2SO_4$. This etch treatment removes a considerable amount of glass material from the surface, such as about 10 microns or more. Thus, it is a reasonable expectation that the glass surface chemistry of the "AG" etched surface and the "HF" etched surface are substantially the same after etching. A significant physical difference between the "AG" and "HF" etched surfaces is their respective relative roughnesses where the AG surfaces generally have a high roughness, such as greater than about 100 nm RMS, and the "HF" surfaces are generally substantially smooth having a roughness below about 10 nm RMS and have no visible optical scattering.

The data presented in FIG. 1 show that samples having no etching on one side and either the "AG" or "HF" etching on the opposite side (sample groups-2 and -3) have elevated waviness, generally in excess of about 250 microns (measurable limit). The non-etched side was protected using an acid-resistant polymer film as described, for example, in commonly owned and assigned copending U.S. Ser. No. 61/329,951. The maximum waviness measurable in this Flatmaster® system was 250 microns, so many of the samples in groups-2 and -3 had waviness greater than 250 microns, for which the numerical value reported was 250 microns (thus the error bars shown in FIG. 1 for groups-2 and -3 are not meaningful).

Sample groups-4 and -5 in FIG. 1 have reduced waviness, of about 100 to about 150 microns on average, which is statistically identical to the control sample group-1. These samples were etched on the back side with the same 10-minute "HF" treatment described previously, and either the "AG" or "HF" treatments on the front side. These reduced-waviness samples demonstrate the creation of a single-side roughened AG sheet of glass with waviness that is comparable to the untreated glass after chemical strengthening. The reduced waviness is independent of the roughness of the AG surface, as illustrated by the samples with "HF" etching on both sides (group-5) having comparable waviness to the "HF" or "AG" etched samples (group-4). The "HF" etched surfaces are optically smooth. This independence with respect to surface roughness is unexpected, since an asymmetric roughness, that is one-sided roughness, could reasonably be expected to produce unbalanced stresses after chemical strengthening, which would promote waviness. These results illustrate that it is possible to create an asymmetric surface roughness without creating unbalanced stresses in chemical strengthening, and maintain a low waviness that is comparable to non-etched or non-roughened samples.

The higher waviness generated in sample groups-2 and -3 is correlated to an imbalance in the surface compressive stresses (measured using an FSM-6000 supplied by Orihara Industrial) created during chemical strengthening, as shown in FIG. 2. Wet-etched surfaces show substantially the same compressive stress within a given sample group, whether they are roughened ("AG" treatment) or non-roughened ("HF" treatment). This indicates that the imbalance in surface compressive stress promotes increased waviness. This difference in surface compressive stress does not correlate with roughness levels, which was surprising and unexpected. The absolute level of compressive stress is determined by ion-exchange conditions and glass properties. Here the ion-exchange was performed in a $KNO_3$ bath at 410° C. for 6 hrs. For waviness or warp reduction, the absolute level of compressive stress is not a major concern. The surface compressive stresses on the roughened and non-roughened surfaces were found to be substantially the same, which correlates to low or reduced waviness. There is a higher standard deviation in the compressive stress measurements on the "AG" surfaces due to the rough surface causing some distortion in the measurement of surface compressive stresses (FSM measurement). Nevertheless, the trends are definitive, and were confirmed by the measurements on the smooth "HF" etched surfaces.

Although not bound by theory, it is believed that the difference in surface compressive stress is caused by small differences in glass surface composition or structure between the etched and as-melted surfaces, which drive slight changes in the ion-exchange behavior. It should also be noted that such differences are likely to be found between etched and mechanically polished surfaces, making the presently disclosed procedures also effective and useful for creating one-sided anti-glare articles using polished glass sheets in addition to as-melted or drawn glass sheets. The surface properties of the glass can be modified by modifying the chemical etchant. However, the range of choices of chemical etchant may be restricted by other process objectives, such as speed and the properties of the surface structure being targeted.

In follow-on experiments, it was also shown that etch treatment times as short as about 1 minute in weaker acid solutions (e.g., 1.9 M/0.6M $HF/H_2SO_4$, removing less than two microns of glass material per surface) are also sufficient to reduce the waviness of a one-side roughened, thin sheet of aluminosilicate glass that goes through subsequent chemical strengthening after the roughening and etching processes. Both surfaces of the glass sheet are subjected to a similar final wet etch treatment before being ion-exchanged.

Chemically strengthened glasses are used in many hand-held and touch-sensitive devices as display windows and cover plates where resistance to mechanical damage can be significant to the visual appearance and functionality of the product.

Reduction in the specular reflection (a significant factor in glare) from these display surfaces is often desired, especially by manufacturers whose products are designed for outdoor use where glare can be exacerbated by sunlight. One way to reduce the intensity of the specular reflection, quantified as gloss, is to roughen the glass surface or cover it with a textured film. The dimensions of the roughness or texture should be large enough to scatter visible light, producing a slightly hazy or matte surface, but not too large as to significantly affect the transparency of the glass. Textured or particle-containing polymer films can be used when maintaining the properties (e.g., scratch resistance) of the glass substrate are not important. While these films may be cheap and easy to apply, they are subject to abrasion which can reduce the display functionality of the device.

One result of roughening a glass surface can be to create "sparkle," which is perceived as a grainy appearance. Sparkle is manifested by the appearance of bright and dark or colored spots at approximately the pixel-level size scale. The presence of sparkle reduces the viewability or perceived quality of pixelated displays.

The makers of mobile phones, laptops, and other electronic devices commonly select glass, especially chemically strengthened glass, as the material of choice for the top cover piece on their flat panel display devices. To reduce the glare/reflection from the ambient environment on the glass surface during the use, there are two main methods: an anti-reflection (AR) coating or an anti-glare (AG) treatment. An anti-reflective (AR) coating modifies the refractive index profile between the display and ambient to achieve the effect, commonly relying on destructive interference. An AG treatment, through roughening the surface, causes the reflection to be scattered into different directions. Generally, to achieve comparable performance, an AR coating is more costly than an AG treatment, and an AR coating may introduce undesirable color shifts.

An AG surface can be produced by roughening the display surface. The surface can be achieved with various methods, such as by AG coating or a chemically etched surface. For an AG coating, the surface can be coated with organic or non-organic droplets or particles. Such coatings can provide the scattering properties, but normally are not very resistant to scratches. Chemically etched surfaces that are properly selected may meet the desired optical requirements, including distinctness of image (DOI), haze, and gloss. For example, the glass can be etched in an HF or buffered HF solution to roughen the surface. However, for many glass compositions, such direct etching cannot create a surface which meets all the optical and visual requirements. Typically, a more complex method has to be applied. U.S. Pat.

Nos. 4,921,626, 6,807,824, 5,989,450, and WO2002053508, mention glass etching compositions and methods of etching glass with the compositions. One example uses ammonium bi-fluoride ($NH_4HF_2$) and a wetting agent, such as propylene glycol, to grow a thin layer of crystals on the surface (frost the surface), then removing the crystals with mineral acid and leave a very hazy surface. A final step dips the glass into the etchant, such as some combination of HF and mineral acid to reduce the haze to achieve the desired surface properties. However, several drawbacks, of existing processes include, for example: etch results are sensitive to chemical concentration(s), temperature, and purity of the etch solution; chemical material cost is high; and the surface glass thickness loss is typically high, e.g., about 50 to about 300 micrometer.

In embodiments, forming the protective film on all or selected portions of at least one surface can include, for example, selective spray deposition, masked spray deposition, ink-jet deposition, screen printing, dip coating, aerosol spray, or a combination thereof. In embodiments, forming the protective film on selected portions of at least one surface can include, for example, creating an array of random spots. In embodiments, the spots can be, for example, substantially random, partially random, entirely random, or a combination thereof.

In embodiments, the spots can protect, for example, from about 70 to about 99 percent of the underlying surface area of the at least one surface. The spots can be, for example, substantially random, partially random, or a combination thereof. The spots can have, for example, an average diameter of about 0.1 to about 1,000 micrometers and the areas on the at least one surface not covered by the spots have an average diameter of about 1 to about 50 micrometers.

In embodiments, the at least one surface can be, for example, a glass, a plastic, a composite, an ion-exchanged strengthened glass, a thermally-tempered strengthened glass, or a combination thereof. In embodiments, the at least one surface can be, for example, substantially flat.

In embodiments, the liquid etchant can be, for example, a source of fluoride ion, a mineral acid, a buffer, or a combination thereof.

In embodiments, the contacting with the liquid etchant can be accomplished, for example, at from about 0.1 to about 15 minutes, at from about 1 to about 10 minutes, at from about 5 to about 10 minutes, and at from about 1 to about 5 minutes, including intermediate values and ranges.

In embodiments, the removing the protective film or pore-forming polymer from the surface of the article can be, for example, at least one of contacting the film with a dissolving liquid, heating the film to liquefy and drain, mechanical scrubbing, ultrasonic agitation, and like removal techniques, or a combination thereof.

In embodiments, the method can further include, for example, selecting at least one of a surface roughness (Ra), a surface haze, and a distinctness-of-image; and etching the surface according to an identified set of conditions (i.e., deterministic differential etch) to obtain the at least one of the selected surface roughness, surface haze, and distinctness-of-image properties for the anti-glare surface Conditions or factors that appear to be significant with respect to differential etch include, for example, polymer solubility in the etchant, polymer film thickness, the protonic to fluoride-ion acid-ratio, the etch time, the temperature (e.g., increased temperature generally increases film dissolution and substrate etch. The single side DOI value can be, for example, from about 40 to about 70 (for DOI 20°), and the haze is less than about 10%. The surface haze can be, for example, less than or equal to 50%, the surface roughness is less than about 800 nm, and the distinctness-of-image reflected is less than about 95.

In embodiments, the methods of making can further comprise including a wetting agent in any of the disclosed forming, contacting, or removing steps, the wetting agent can be, for example, at least one of a glycol, a glycerol, an alcohol, a ketone, a surfactant, and like materials, or a combination thereof.

In embodiments, the glass article can be, for example, one of a soda lime silicate glass, an alkaline earth aluminosilicate glass, an alkali aluminosilicate glass, an alkali borosilicate glass, a boroaluminosilicate glass, and like materials, or a combination thereof.

In embodiments, the at least one surface can be, for example, a glass, a composite, an ionically-exchanged strengthened glass, a thermally-tempered strengthened glass, and like materials, or a combination thereof. The at least one surface can be, for example, a substantially macroscopically flat glass sheet.

In embodiments, the protective film or polymer coating can be any suitable coating material, for example, at least one polymer, or a combination of polymers, and like natural or synthetic materials, or a combination thereof. Suitable pore-former compositions, which can provide durable yet removable porous coatings can be, for example, any polymer or polymer formulation, or like material or mixtures, having film-forming and pore-forming properties, such as TSO-3100 DOD ink (an ethanol isopropyl-based jettable ink from Diagraph), an acetone-based o/p-toluene sulfonamide formaldehyde resin, a nitrocellulose, an acrylate polymer, an acrylate copolymer, a lacquer (a polymer dissolved in a volatile organic compound) formulation, an enamel, a wax, and like materials, or combinations thereof. In embodiments, if desired, the gloss, haze, DOI, uniformity, or like appearance properties of the intermediate film coated substrate or article can be adjusted or modified by any method compatible with the overarching methods and articles of the disclosure.

In embodiments, the protective surface mask can be accomplished by contacting the at least one surface of the article using any suitable coating method with any suitable coating material, such as, by selective application, for example, on a macroscopic or microscopic scale, with a spray coater or like device or method.

The liquid etchant can be, for example, a source of fluoride ion, a mineral acid, a buffer, or a combination thereof. The source of fluoride can be, for example, a salt selected from ammonium fluoride, ammonium bi-fluoride, sodium fluoride, sodium bi-fluoride, potassium fluoride, potassium bi-fluoride, and like salts, or a combination thereof. The mineral acid can be, for example, one of hydrofluoric acid, sulfuric acid, hydrochloric acid, nitric acid, and phosphoric acid, and like acids, or a combination thereof.

The contacting of the porous polymer layer with the liquid etchant can be, for example, accomplished at from about 0.1 to about 5 minutes. The removing of the etchant-contacted porous polymer layer from the surface of the article can be, for example, at least one of contacting the polymer layer with a dissolving liquid, heating polymer layer to liquefy and draining the liquid polymer, or a combination thereof. The selecting of at least one of a surface roughness (Ra), a surface haze, and a distinctness-of-image, or a combination thereof; and etching the surface according to an identified set of conditions, for example, etching with a mixture of 2 M HF and 2.4 M $H_2SO_4$ for 1 min, to obtain the at least one of the selected surface roughness, surface haze, and distinctness-of-image. In embodiments, a single-side DOI value can be, for example, from about 1 to about 70 (for DOI 20°), and the haze is less than about 10%. The surface haze can be, for example, less than or equal to 50%, the surface roughness is less than about 800 nm. Alternatively, the distinctness-of-image reflected can be less than about 95. The method can further include a wetting agent comprising at least one of a glycol, a glycerol, an alcohol, a ketone, a surfactant, or a combination thereof. The glass article can be, for example, one of a soda lime silicate glass, an alkaline earth aluminosilicate glass, an alkali aluminosilicate glass, an alkali borosilicate glass, and like glasses, or combinations thereof. The glass article can be, for example, an alkali aluminosilicate glass comprising: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol≤% $Li_2O+Na_2O+K_2O$≤20 mol % and 0 mol %≤MgO+CaO≤10 mol %. The alkali aluminosilicate glass can be, for example: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO; or for example: 60-72 mol % $SiO_2$; 9-16 mol % $Al_2O_3$; 5-12 mol % $B_2O_3$; 8-16 mol % $Na_2O$; and 0-4 mol % $K_2O$, where the ratio $$\frac{Al_2O_3(\text{mol }\%) + B_2O_3(\text{mol }\%)}{\Sigma \text{ alkali metal modifiers (mol }\%)} > 1.$$

In embodiments, the glass article can have good to excellent uniformity properties, that is, an absence of detectable streaks, pin holes, blotches, and like defects. The glass article can be, for example, a sheet of the glass which provides a protective cover for at least one of a hand held electronic device, an information-related terminal, or a touch sensor device. The anti-glare surface of the glass article can be, for example, a distribution of topographic features having an average diameter of about 1 to about 50 micrometers. The anti-glare surface can be, for example, a protective cover glass for a display device, such as an information display device, a media display device, and like devices.

In embodiments, the disclosure provides a glass article where only one surface of the glass article has an anti-glare surface having a surface roughness (Ra) of about 50 to about 300 nm, and an opposing surface of the glass article is optically smooth with a surface roughness (Ra) below about 10 nm. In embodiments, the glass can be, for example, an aluminosilicate glass having greater than about 2.0 mol % $Al_2O_3$. In embodiments, the glass can be, for example, chemically strengthened and has a surface compressive stress greater than 400 MPa.

In embodiments, the disclosure provides a display system including, for example:

a glass panel having at least one roughened surface including a haze of less than about 10%; a distinctness-of-image (DOI 20°) of about 1 to about 75; and a surface roughness (Ra) of about 80 to about 300 nm, which properties provide an anti-glare surface; and a pixelated image-display panel adjacent to the glass panel.

In embodiments, the disclosure provides methods of making a glass article having an anti-glare surface, and methods of forming an anti-glare surface on a surface of a glass article.

In embodiments, the disclosure provides a wet etch method for generating an anti-glare surface on the glass while preserving its inherent mechanical surface properties. During the process, a glass surface having a porous polymer layer is exposed to chemicals which can preferentially degrade the glass surface to alter the surface roughness dimensions that are responsible for scattering visible light. When significant quantities of mobile alkali ions are present in the glass, such as in soda lime silicate glasses, a roughened surface can be formed by, for example, contacting the glass surface, or a portion of the glass surface, or access restricted portions of the glass surface, in or with an acid etchant solution, such as a solution containing fluoride ion. These and other aspects of the disclosure are illustrated and demonstrated herein.

In embodiments, the article comprises, consists essentially of, or consists of one of a soda lime silicate glass, an alkaline earth aluminosilicate glass, an alkali aluminosilicate glass, an alkali borosilicate glass, and combinations thereof. Examples of such glasses are described herein. For additional definitions, descriptions, and methods of silica materials and related metal oxide materials, see for example, R. K. Iler, *The Chemistry of Silica*, Wiley-Interscience, 1979.

In embodiments, the glass article can be a transparent or semi-transparent glass sheet, such as those used as cover plates and windows for display and touch screen applications, for example, portable communication and entertainment devices such as telephones, music players, video players, or like devices; and as display screens for information-related terminal (IT) (e.g., portable or laptop computers) devices; and like applications. The glass article or substrate can have a thickness of up to about 3 millimeters (mm). In embodiments, the thickness can be from about 0.2 to about 3 mm. In embodiments, the glass article can have at least one surface that is unpolished. In embodiments, the step of coating the surface of the article or substrate can include additional optional preparative, pretreatment, or post-treatment procedures, for example, removing oil, foreign matter, or other debris that may inhibit etching from the at least one surface using methods known in the art, including, for example, washing with soaps or detergents, ultrasonic cleaning, treatment with surfactants, and like methods.

When a single-side acid-etch is desired on a sheet of glass, one side of the glass can be protected from the etching solution. Protection can be achieved by applying an insoluble non-porous coating such as an acrylic wax, or laminate film having an adhesive layer, for example, acrylic, silicone, and like adhesives materials, or combinations thereof. Coating application methods can include, for example, brushing, rolling, spraying, laminating, and like methods. The acid etch exposed insoluble non-porous coating survives the etching process and can be readily removed after processing, such as contemporaneously or separately from the removal of the protective film or porous polymer layer.

In embodiments, a glass article is provided. The glass article can be ion-exchangeable and has at least one roughened surface. The roughened surface has a distinctness-of-reflected image (DOI) of less than 90 when measured at an incidence angle of 20°. A pixelated display system that includes the glass article is also provided. The glass article can be, for example, a planar sheet or panel having two major surfaces joined on the periphery by at least one edge, although the glass article can be formed into other shapes such as, for example, a three-dimensional shape. At least one of the surfaces is a roughened surface including, for example, topological or morphological features, such as, projections, protrusions, depressions, pits, closed or open cell structures, particles, and like structures or geometries, or combinations thereof.

In embodiments, the disclosure provides an aluminosilicate glass article. The aluminosilicate glass article comprises at least 2 mol % $Al_2O_3$, can be ion-exchangeable, and has at least one roughened surface. The aluminosilicate glass article has at least one roughened surface comprising a plurality of topographical features. The plurality of topographical features can have an average characteristic largest feature size (ALF) of from about 1 micrometer to about 50 micrometers.

In embodiments, the disclosure provides a display system. The display system can include at least one aluminosilicate glass panel and a pixelated image-display panel adjacent to the aluminosilicate glass panel. The image-display panel has a minimum native pixel pitch dimension. The average characteristic largest feature size of the glass panel can be less than the minimum native pixel pitch dimension of the display panel. The pixelated image display panel can be, for example, one of an LCD display, an OLED display, or like display devices. The display system can also include touch-sensitive elements or surfaces. The aluminosilicate glass can be ion-exchanged and has at least one roughened surface comprising a plurality of features having an average largest feature size, or ALF, and the image-displaying panel has a minimum native pixel pitch. The minimum native pixel pitch can be, for example, greater than the ALF of the roughened surface of the aluminosilicate glass panel.

ALF is measured in the plane of (i.e., in the x- and y-direction or parallel to) the roughened glass surface, and is therefore independent of roughness. Roughness is a measurement of feature variation in the z-direction (thickness direction), perpendicular to the roughened glass surface. Selecting the largest characteristic features is an important distinction from other methods that determine a more global average feature size. The largest features are most easily seen by the human eye and are therefore most important in determining visual acceptance of the glass article. In embodiments, the topological or morphological features of the at least one roughened surface has an average characteristic largest feature (ALF) size of from about 1 micrometer to about 50 micrometers, of from about 1 micrometers to about 40 micrometers; of from about 1 micrometers to about 30 micrometers, including intermediate values and ranges. The average characteristic largest feature size is the average cross-sectional linear dimension of the largest 20 repeating features within a viewing field on a roughened surface. A standard calibrated optical light microscope can typically be used to measure feature size. The viewing field is proportional to the feature size, and typically has an area of approximately 30(ALF)×30(ALF). If, for example, the ALF is approximately 10 micrometers, then the viewing field from which the 20 largest features are selected is approximately 300 micrometers×300 micrometers. Small changes in the size of the viewing field do not significantly affect ALF. The standard deviation of the 20 largest features that are used to determine ALF should generally be less than 40% of the average value, i.e., major outliers should be ignored since these are not considered "characteristic" features.

The features used to calculate ALF are "characteristic;" i.e., at least 20 similar features can be located in the proportional viewing field. Different morphologies or surface structures can be characterized using ALF. For example, one surface structure may appear to be closed-cell repeating structures, another may appear to be small pits separated by large plateaus, and a third may appear to be a field of small particles punctuated by intermittent large smooth regions. In each case, the ALF is determined by measuring the largest 20 repeating surface regions that are substantially optically smooth. In the case of the repeating closed cell surface structure, the features to be measured are the largest of the cells in the closed-cell matrix. For the surface structure comprising small pits separated by large plateaus, the large plateaus between pits are to be measured. For the surface comprising a field of small particles punctuated by intermittent large smooth regions, the intermittent large smooth regions are to be measured. A wide variety of surfaces with substantially varying morphologies can thus be characterized using ALF.

The topography of the anti-glare surface can include, for example, features such as protrusions or projections, depressions, and the like having a maximum out-of-plane dimension of, for example, less than about 1,000 nm. In embodiments, the anti-glare surface can have a RMS roughness of about 800 nm, of about 500 nm, and about 100 nm, including intermediate values and ranges.

In embodiments, the at least one roughened surface of the glass article has an average RMS roughness can be from about 10 nm to about 800 nm. In embodiments, the average RMS roughness can be from about 40 nm to about 500 nm. In embodiments, the average RMS roughness can be from about 40 nm to about 300 nm. In embodiments, the average RMS roughness can be greater than about 10 nm and less than about 10% of the ALF. In embodiments, the average RMS roughness can be greater than about 10 nm and less than about 5% of ALF, and greater than about 10 nm and less than about 3% of ALF, including intermediate values and ranges.

The specification of low DOI and high Ros/Ra provide constraints on the characteristic feature size and ALF. For a given roughness level, it has been found that larger feature sizes result in lower DOI and higher Ros/Ra. Therefore, to balance the display sparkle and the DOI target, in embodiments, it can be desirable to create anti-glare surfaces having an intermediate characteristic feature size that is neither too small nor too large. It is also desirable to minimize reflected or transmitted haze when the transmitted haze is scattering into very high angles that can cause a milky white appearance of a roughened article under ambient lighting.

"Transmission haze," "haze," or like terms refer to the percentage of transmitted light scattered outside an angular cone of ±4.0° according to ASTM D1003. For an optically smooth surface, transmission haze is generally close to zero. Transmission haze of a glass sheet roughened on two sides ($Haze_{2\text{-}side}$) can be related to the transmission haze of a glass sheet having an equivalent surface that is roughened on only one side ($Haze_{1\text{-}side}$), according to the approximation of eq. (2):

$$Haze_{2\text{-}side} \approx [(1-Haze_{1\text{-}side}) \cdot Haze_{1\text{-}side}] + Haze_{1\text{-}side} \quad (2).$$

Haze values are usually reported in terms of percent haze. The value of $Haze_{2\text{-}side}$ from eq. (2) must be multiplied by 100. In embodiments, the disclosed glass article can have a transmission haze of less than about 50% and even less than about 30%.

A multistep surface treatment process has been used to form the roughened glass surface. An example of a multistep etch process is disclosed in commonly owned copending U.S. Provisional Patent Appln 61/165,154, filed Mar. 31, 2009, to Carlson, et al., entitled "Glass Having Anti-Glare Surface and Method of Making," where a glass surface is treated with a first etchant to form crystals on the surface, then etching a region of the surface adjacent to each of the crystals to a desired roughness, followed by removing the crystals from the glass surface, and reducing the roughness of the surface of the glass article to provide the surface with a desired haze and gloss.

The contacting with etchant can involve, for example, selective partial or complete dipping, spaying, immersion, and like treatments, or combination of treatments with an acidic etch solution including, for example, 2 to 10 wt % hydrofluoric acid and 2 to 30 wt % of a mineral acid, such as hydrochloric acid, sulfuric acid, nitric acid, phosphoric acid, and like acids, or combinations thereof. In embodiments, a general etch trend appears to be that fluoride ion concentrations tend to influence the extent of glass substrate etching, and protic acid concentrations tend to influence the extent of protective coating degradation during substrate etching. The glass surface can be etched in the solution for periods of from about 1 to about 10 minutes, with longer times generally leading to a greater surface roughness. The disclosed concentrations and etch times are representative of suitable examples. Concentrations and etch times outside the disclosed ranges can also be used to obtain the roughened surface of the glass article albeit potentially less efficiently.

In chemical strengthening, larger alkali metal ions are exchanged for smaller mobile alkali ions near the glass surface. This ion-exchange process places the surface of the glass in compression, allowing it to be more resistant to any mechanical damage. In embodiments, the outer surface of the glass article can optionally be ion-exchanged where smaller metal ions are replaced or exchanged by larger metal ions having the same valence as the smaller ions. For example, sodium ions in the glass can be replaced with larger potassium ions by immersing the glass in a molten salt bath containing potassium ions at a temperature below the strain point of the glass. The replacement of smaller ions with larger ions creates a compressive stress within the layer. In embodiments, the larger ions near the outer surface of the glass can be replaced by smaller ions, for example, when heating the glass to a temperature above the strain point of the glass. Upon cooling to a temperature below the strain point, a compressive stress is created in an outer layer of the glass. Chemical strengthening of the glass can optionally be performed after the surface roughening treatment, with little negative effect on the ion-exchange behavior or the strength of the glass article.

With a proper design selection, the disclosed process does not need backside protection to make single-sided samples. Single-sided samples can be prepared using for example, single-side dip, spray, or spin coating methods. A multi-bath conventional process needs backside protection film, which can increase manufacturing costs.

In embodiments, the alkali aluminosilicate glass comprises, consists essentially of, or consists of, for example: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≤$Li_2O+Na_2O+K_2O$≤20 mol % and 0 mol %≤MgO+CaO≤10 mol %. In embodiments, the alkali aluminosilicate glass can comprise, consists essentially of, or consists of, for example: 60-72 mol % $SiO_2$; 9-16 mol % $Al_2O_3$; 5-12 mol % $B_2O_3$; 8-16 mol % $Na_2O$; and 0-4 mol % $K_2O$. In embodiments, the alkali aluminosilicate glass can comprise, consists essentially of, or consists of: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO. In embodiments, the glass can be batched with 0 to 2 mol % of at least one fining agent, such as $Na_2SO_4$, NaCl, NaF, NaBr, $K_2SO_4$, KCl, KF, KBr, $SnO_2$, or combinations thereof.

The aluminosilicate glass, in embodiments, can be substantially free of lithium. In embodiments, the aluminosilicate glass can be substantially free of at least one of arsenic, antimony, barium, or combinations thereof.

In embodiments, the selected glass can be, for example, down drawable, i.e., formable by methods such as slot draw or fusion draw processes that are known in the art. In these instances, the glass can have a liquidus viscosity of at least 130 kpoise. Examples of alkali aluminosilicate glasses are described in commonly owned and assigned U.S. patent application Ser. No. 11/888,213, to Ellison, et al., entitled "Down-Drawable, Chemically Strengthened Glass for Cover Plate," filed Jul. 31, 2007, having priority to U.S. Provisional Appln 60/930,808, filed May 22, 2007; U.S. patent application Ser. No. 12/277,573, to Dejneka, et al., entitled "Glasses Having Improved Toughness and Scratch Resistance," filed Nov. 25, 2008, which claims priority from U.S. Provisional Appln 61/004,677, filed Nov. 29, 2007; U.S. patent application Ser. No. 12/392,577, to Dejneka, et al., entitled "Fining Agents for Silicate Glasses," filed Feb. 25, 2009, which claims priority from U.S. Provisional Appln No. 61/067,130, filed Feb. 26, 2008; U.S. patent application Ser. No. 12/393, 241, to Dejneka, et al., entitled "Ion-Exchanged, Fast Cooled Glasses," filed Feb. 26, 2009, which claims priority to U.S. Provisional Appln No. 61/067,732, filed Feb. 29, 2008; U.S. patent application Ser. No. 12/537,393, to Barefoot, et al., entitled "Strengthened Glass Articles and Methods of Making," filed Aug. 7, 2009, having priority to U.S. Provisional Appln No. 61/087,324, entitled "Chemically Tempered Cover Glass," filed Aug. 8, 2008; U.S. Provisional Patent Appln No. 61/235,767, to Barefoot, et al., entitled "Crack and Scratch Resistant Glass and Enclosures Made Therefrom," filed Aug. 21, 2009; and U.S. Provisional Patent Appln No. 61/235,762, to Dejneka, et al., entitled "Zircon Compatible Glasses for Down Draw," filed Aug. 21, 2009.

The glass surfaces and sheets described in the following example(s) can use any suitable coatable and etchable glass substrate or like substrates, including for example, the glass compositions 1 through 11 listed in Table 1.

TABLE 1

Representative glass compositions.

| Oxides (mol %) | Glass | | | | | | | | | | |
|---|---|---|---|---|---|---|---|---|---|---|---|
| | 1 | 2 | 3 | 4 | 5 | 6 | 7 | 8 | 9 | 10 | 11 |
| $SiO_2$ | 66.16 | 69.49 | 63.06 | 64.89 | 63.28 | 67.64 | 66.58 | 64.49 | 66.53 | 67.19 | 70.62 |
| $Al_2O_3$ | 10.29 | 8.45 | 8.45 | 5.79 | 7.93 | 10.63 | 11.03 | 8.72 | 8.68 | 3.29 | 0.86 |
| $TiO_2$ | 0 | — | — | — | — | 0.64 | 0.66 | 0.056 | 0.004 | — | 0.089 |
| $Na_2O$ | 14 | 14.01 | 15.39 | 11.48 | 15.51 | 12.29 | 13.28 | 15.63 | 10.76 | 13.84 | 13.22 |
| $K_2O$ | 2.45 | 1.16 | 3.44 | 4.09 | 3.46 | 2.66 | 2.5 | 3.32 | 0.007 | 1.21 | 0.013 |
| $B_2O_3$ | 0.6 | — | 1.93 | — | 1.9 | — | — | 0.82 | — | 2.57 | — |
| $SnO_2$ | 0.21 | 0.185 | — | — | 0.127 | — | — | 0.028 | — | — | — |
| BaO | 0 | — | — | — | — | — | — | 0.021 | 0.01 | 0.009 | — |
| $As_2O_3$ | 0 | — | — | — | — | 0.24 | 0.27 | — | — | 0.02 | — |
| $Sb_2O_3$ | — | — | 0.07 | — | 0.015 | — | 0.038 | 0.127 | 0.08 | 0.04 | 0.013 |
| CaO | 0.58 | 0.507 | 2.41 | 0.29 | 2.48 | 0.094 | 0.07 | 2.31 | 0.05 | 7.05 | 7.74 |
| MgO | 5.7 | 6.2 | 3.2 | 11.01 | 3.2 | 5.8 | 5.56 | 2.63 | 0.014 | 4.73 | 7.43 |

TABLE 1-continued

Representative glass compositions.

| Oxides (mol %) | Glass | | | | | | | | | | |
|---|---|---|---|---|---|---|---|---|---|---|---|
| | 1 | 2 | 3 | 4 | 5 | 6 | 7 | 8 | 9 | 10 | 11 |
| $ZrO_2$ | 0.0105 | 0.01 | 2.05 | 2.4 | 2.09 | — | — | 1.82 | 2.54 | 0.03 | 0.014 |
| $Li_2O$ | 0 | — | — | — | — | — | — | — | 11.32 | — | — |
| $Fe_2O_3$ | 0.0081 | 0.008 | 0.0083 | 0.008 | 0.0083 | 0.0099 | 0.0082 | 0.0062 | 0.0035 | 0.0042 | 0.0048 |
| SrO | — | — | — | 0.029 | — | — | — | — | — | — | — |

In embodiments, a particularly useful and popular glass composition for use in the disclosed process is Code 2318 glass (see composition 2 in Table 1), commercially available from Corning, Inc., (i.e., Corning® Gorilla® glass; see for example, corning.com (see also U.S. Provisional Patent Application 61/235,762, supra.). The Code 2318 glass can have a composition specified within the following combined ranges, for example: 61 mol %≤$SiO_2$≤75 mol %; 7 mol %≤$Al_2O_3$≤15 mol %; 0 mol %≤$B_2O_3$≤12 mol %; 9 mol %≤$Na_2O$≤21 mol %; 0 mol %≤$K_2O$≤4 mol %; 0 mol %≤MgO≤7 mol %; and 0 mol %≤CaO≤3 mol %.

EXAMPLES

The following examples serve to more fully describe the manner of using the above-described disclosure, and to further set forth the best modes contemplated for carrying out various aspects of the disclosure. It is understood that these examples do not limit the scope of this disclosure, but rather are presented for illustrative purposes. The working examples further describe the methods and how to make the articles of the disclosure.

Example 1

Sample Group-4 Preparation

FIGS. 1 and 2 demonstrate that Sample Group-4 samples comprise single-side roughened anti-glare glass sheets that are further chemically strengthened to have a balanced compressive stress and low waviness, and further have imbalanced roughness between the two surfaces but a balanced chemical treatment. Aluminosilicate glass sheets (Corning code 2318) measuring 200 mm×200 mm×0.7 mm were cleaned in an ultrasonic cleaner using a cleaning agent (about 4% Semi-clean KG). The glass sheets were rinsed, dried and laminated on one side using an acid-resistant adhesive polymer film (ANT-200 from Seil Hi-Tec) to form a protective coating on one side of the glass sheet. The single-side protected sheets were then dipped in a static bath consisting of 10 wt % ammonium bifluoride and 20 wt % propylene glycol and the remainder being deionized water, for 15 minutes. The sheets were then rinsed for 30 seconds in deionized water and dipped in a bath of 1 M sulfuric acid for 10 minutes while the sample holder was smoothly agitated vertically at a rate of 20 mm/second. The sheets were then rinsed for 30 seconds in deionized water and the protective polymer film was removed by manual peeling and rinsing with deionized water. The sheets having both surfaces exposed were then dipped in a mixture of 3 M hydrofluoric acid and 3.6 M sulfuric acid for 10 minutes with vertical sample agitation at 20 mm/second. The sheets were rinsed and dried, then ion-exchanged in a $KNO_3$ bath at 410° C. for 6 hours. The resulting sheets had one-side having anti-glare properties (i.e., the one roughened surface described above), substantially balanced compressive stress between the two surfaces, and low waviness which was comparable to control samples (i.e., unetched and ion-exchanged).

Example 2

Alternative Method for Making Single-Side Roughened, Anti-Glare, Chemically Strengthened, Glass Sheets Example 2 results are not shown in FIG. 1 or 2. Instead this example provides an alternative method for creating single-side roughened, anti-glare glass sheets that are chemically strengthened. The sheets have balanced compressive stress and low waviness, and have a relative imbalanced roughness for the two surfaces but have a balanced chemical treatment. Aluminosilicate glass sheets (Corning code 2318) measuring 200 mm×200 mm×0.7 mm were cleaned in an ultrasonic cleaner using a cleaning agent (e.g., about 4% Semi-clean KG). The glass sheets were rinsed, dried and laminated (i.e., protected) on one side using an acid-resistant adhesive polymer film (ANT-200 from Seil Hi-Tec). The sheets were then dipped in a static bath consisting of 1 M ammonium fluoride, 2.4 M propylene glycol, 0.6 M hydrochloric acid, and 0.5 M hydrofluoric acid (with the remainder being deionized water) for 9 minutes. The sheets were then rinsed for 30 seconds in deionized water and dipped in a bath of 1 M sulfuric acid for 5 minutes while the sample holder was smoothly vertically agitated at a rate of 100 mm/second. The sheets were then rinsed for 30 seconds in deionized water and the protective polymer film was removed by manual peeling and rinsing with deionized water. The sheets having both surfaces exposed were then dipped in a mixture of 2 M hydrofluoric acid and 2.4 M sulfuric acid for 3 minutes with vertical sample agitation at 150 mm/second. The sheets were rinsed and dried, then ion-exchanged in a $KNO_3$ bath at 410° C. for 6 hours. The resulting sheets had one-side anti-glare properties (i.e., one roughened surface as described above), substantially balanced compressive stress between the two surfaces, and low waviness which waviness was comparable to the control samples (i.e., an un-etched and ion-exchanged sample).

Comparative Example 1

Sample Group-2 Preparation

Comparative example 1 describes the preparation of sample group-2 shown in FIGS. 1 and 2. Sample group-2 is a more conventional method to prepare single-side roughened, anti-glare glass sheets using an imbalanced chemical treatment on the two surfaces. Aluminosilicate glass sheets (Corning code 2318) measuring 200 mm×200 mm×0.7 mm were cleaned in an ultrasonic cleaner using a cleaning agent (e.g., about 4% Semi-clean KG). The glass sheets were dried and laminated on one side using an acid-resistant adhesive polymer film (ANT-200 from Seil Hi-Tec). The sheets were then dipped in a static bath consisting of 10 wt % ammonium bifluoride and 20% propylene glycol (the remainder being deionized water) for 15 minutes. The sheets were then rinsed for 30 seconds in deionized water and dipped in a bath of 1 M sulfuric acid for 10 minutes while the sample holder was smoothly agitated vertically at a rate of 20 mm/second. The sheets were then rinsed for 30 seconds in deionized water. The sheets were then dipped in a mixture of 3 M hydrofluoric acid and 3.6 M sulfuric acid for 10 minutes (without polymer film removal) and with vertical sample agitation at 20 mm/second. The sheets were rinsed and dried, then ion-exchanged in a $KNO_3$ bath at 410° C. for 6 hours. The resulting sheets had one-side having anti-glare properties (i.e., one roughened surface, as described above), but with substantially imbalanced compressive stress between the two surfaces, and high waviness compared to the control samples (i.e., unetched and ion-exchanged).

Comparative Example 2

Comparative Example 2 results are not shown in FIG. 1 or 2. The example describes an alternative method to prepare single-side roughened, anti-glare glass sheets using an imbalanced chemical treatment on the two surfaces. Aluminosilicate glass sheets (Corning code 2318) measuring 200 mm×200 mm×0.7 mm were cleaned in an ultrasonic cleaner using a cleaning agent (i.e., about 4% Semi-clean KG). The glass sheets were rinsed, dried, and laminated on one-side using an acid-resistant adhesive polymer film (ANT-200 from Seil Hi-Tec). The sheets were then dipped in a static bath consisting of 1 M ammonium fluoride, 2.4 M propylene glycol, 0.6 M hydrochloric acid, and 0.5 M hydrofluoric acid, with the balance of the bath being deionized water, for 9 minutes. The sheets were then rinsed for 30 seconds in deionized water and dipped in a bath of 1 M sulfuric acid for 5 minutes while the sample holder was smoothly agitated vertically at a rate of 100 mm/second. The sheets were then rinsed for 30 seconds in deionized water. The sheets were then dipped in a mixture of 2 M hydrofluoric acid and 2.4 M sulfuric acid (without polymer film removal) for 1 minute with vertical sample agitation at 150 mm/second. The sheets were rinsed and dried, the polymer film was removed by manual peeling and rinsing with deionized water. The sheets were then dipped again in 1 M sulfuric acid for 5 minutes and cleaned again in the ultrasonic cleaner as previously. The sheets were rinsed and dried, then ion-exchanged in a $KNO_3$ bath at 410 C for 6 hours. The resulting sheets had one-side having anti-glare properties (i.e., one roughened surface, as described above), but with substantially imbalanced compressive stress values for the two surfaces (693 MPa average on substantially smooth surface, and 679 MPa average on roughened surface), and high waviness (250 microns or more, beyond measurement instrument limit) compared to the control samples (i.e., unetched and ion-exchanged).

The disclosure has been described with reference to various specific embodiments and techniques. However, it should be understood that many variations and modifications are possible while remaining within the scope of the disclosure.

What is claimed is:

1. A chemically-strengthened glass sheet comprising:
a smooth first side; and
a rough second side,
wherein the compressive stress values of the smooth first side and the rough second side are substantially in equipoise, and the smooth first side has an RMS roughness less than about 10 nm and the rough second side has an RMS roughness greater than about 50 nm.

2. The glass sheet of claim 1 wherein the difference between the compressive stress values of the smooth first side and the rough second side is less than about 2%.

3. The glass sheet of claim 1 wherein the compressive stress value of the smooth first side is greater than about 400 MPa, the compressive stress value of the rough second side is greater than about 400 MPa, and the difference in the compressive stress values between the two sides of the glass sheet is less than about 10 MPa.

4. The glass sheet of claim 1, wherein the chemically strengthened glass article contains greater than about 2 mol % $Al_2O_3$, $ZrO_2$, or both.

5. The glass sheet of claim 1, wherein the chemically strengthened glass article has a surface compressive stress greater than about 350 MPa and an ion-exchange depth-of-layer greater than 15 microns.

6. The glass sheet of claim 1, wherein the chemically strengthened glass article contains less than about 4 mol % CaO.

7. The glass sheet of claim 1 wherein the sheet has anti-glare properties comprising a 20 degree reflective DOI of less than 90 and transmission haze of less than 50.

8. The glass sheet of claim 1 where the sheet is at least 200 mm×200 mm in size and the maximum waviness of the sheet after chemical strengthening is less than 200 microns.

* * * * *